United States Patent
Zigovszki et al.

(10) Patent No.: US 9,891,088 B2
(45) Date of Patent: Feb. 13, 2018

(54) REAL-TIME FLOW COMPENSATION IN USAGE ACCUMULATION

(71) Applicant: Mueller International, LLC, Atlanta, GA (US)

(72) Inventors: Szabolcs Zigovszki, Mableton, GA (US); Ian Phillip Harvey, Bristol (GB); Francis J. Stifter, Jr., Hampton Falls, NH (US); Matt Allen Thomas, Cornelius, NC (US)

(73) Assignee: Mueller International, LLC, Atlanta, GA (US)

( * ) Notice: Subject to any disclaimer, the term of this patent is extended or adjusted under 35 U.S.C. 154(b) by 671 days.

(21) Appl. No.: 14/490,375

(22) Filed: Sep. 18, 2014

(65) Prior Publication Data

US 2016/0084692 A1   Mar. 24, 2016

(51) Int. Cl.
*G01F 15/075*   (2006.01)

(52) U.S. Cl.
CPC ................ *G01F 15/0755* (2013.01)

(58) Field of Classification Search
CPC ........ G01D 3/08; G01D 7/00; G01F 15/0755; G01F 1/075; G01F 1/08; G01F 1/115; G01F 1/12
USPC ........... 702/45, 46, 50, 100; 73/201, 204.11, 73/273, 861.42, 861.78; 340/870.02; 455/557; 700/283
See application file for complete search history.

(56) References Cited

U.S. PATENT DOCUMENTS

| | | |
|---|---|---|
| 676,656 A | 6/1901 | Haas |
| 3,045,486 A | 7/1962 | Thomas et al. |
| 3,067,612 A | 12/1962 | Smith |
| 3,308,664 A | 3/1967 | Kullmann |
| 4,663,970 A | 5/1987 | Sutherland |
| 4,995,643 A | 2/1991 | Rappart et al. |
| 5,086,292 A | 2/1992 | Johnson et al. |
| 5,099,348 A | 3/1992 | Huddleston et al. |
| 5,339,686 A | 8/1994 | Dejarlais et al. |
| 5,473,322 A | 12/1995 | Carney |
| 5,631,554 A | 5/1997 | Briese et al. |
| 5,706,273 A | 1/1998 | Guerreri |
| 5,910,653 A | 6/1999 | Campo |
| 6,588,447 B1 | 7/2003 | Hendey |

(Continued)

FOREIGN PATENT DOCUMENTS

| | | |
|---|---|---|
| EP | 0359665 | 12/1992 |
| KR | 100959519 | 5/2010 |

OTHER PUBLICATIONS

Zigovszki, Szabolcs; Non-Final Office Action for U.S. Appl. No. 14/490,403, filed Sep. 18, 2014, dated Mar. 31, 2016, 26 pgs.

(Continued)

*Primary Examiner* — John H Le
(74) *Attorney, Agent, or Firm* — Taylor English Duma LLP

(57) ABSTRACT

Technologies are described herein for compensating for inaccuracies in flow measurement in real-time during accumulation of usage. A pulse count indicating an amount of flow in a meter over a measurement period is read. An average flow rate through the meter for the measurement period is determined and a correction factor is looked up from a table based on the average flow rate. A total usage accumulator for the meter is then updated with the amount of flow over the measurement period based on the pulse count and the correction factor.

20 Claims, 6 Drawing Sheets

(56) References Cited

U.S. PATENT DOCUMENTS

| | | |
|---|---|---|
| 6,774,807 B1 | 8/2004 | Lehfeldt |
| 7,007,558 B1 | 3/2006 | Carpenter |
| 7,565,255 B2 * | 7/2009 | Kanke .................... G01F 1/696 |
| | | 702/100 |
| 8,344,881 B1 | 1/2013 | Hays |
| 9,476,740 B2 | 10/2016 | Zigovszki |
| 9,671,254 B2 | 6/2017 | Zigovszki et al. |
| 2002/0126157 A1 | 9/2002 | Farago et al. |
| 2002/0193144 A1 | 12/2002 | Belski et al. |
| 2003/0193405 A1 | 10/2003 | Hunt |
| 2004/0021568 A1 | 2/2004 | Seal et al. |
| 2005/0066746 A1 | 3/2005 | Winter |
| 2007/0229256 A1 | 10/2007 | Seal et al. |
| 2007/0241930 A1 | 10/2007 | Qureshi et al. |
| 2010/0245309 A1 | 9/2010 | Matsuki |
| 2010/0321205 A1 | 12/2010 | Olson et al. |
| 2011/0115643 A1 | 5/2011 | Gilbert |
| 2012/0074927 A1 | 3/2012 | Ramirez |
| 2013/0088353 A1 | 4/2013 | Lafrance |
| 2013/0113631 A1 | 5/2013 | Pitchford |
| 2013/0257630 A1 | 10/2013 | Brennan et al. |
| 2014/0028465 A1 | 1/2014 | Cornwall |
| 2014/0281624 A1 | 9/2014 | Cahill-O'Brien et al. |
| 2014/0282550 A1 | 9/2014 | Blumenfeld et al. |
| 2014/0361908 A1 | 12/2014 | Laird et al. |
| 2017/0153123 A1 | 6/2017 | Cullinan |

OTHER PUBLICATIONS

Zigovszki, Szabolcs; Non-Final Office Action for U.S. Appl. No. 14/490,412, filed Sep. 18, 2014, dated Jan. 1, 2016, 21 pgs.
Zigovszki, Szabolcs; Non-Final Office Action for U.S. Appl. No. 14/490,381, filed Sep. 18, 2014, dated Jul. 13, 2016, 28 pgs.
Zigovszki, Szabolcs; Corrected Notice of Allowability for U.S. Appl. No. 14/490,412, filed Sep. 18, 2014, dated Aug. 3, 2016, 4 pgs.
Zigovszki, Szabolcs; Notice of Allowance for U.S. Appl. No. 14/490,412, filed Sep. 18, 2014, dated Jul. 11, 2016, 9 pgs.
Cole, Martin; Applicant Initiated Interview Summary for U.S. Appl. No. 14/490,095, filed Sep. 18, 2014, dated Jul. 6, 2016, 3 pgs.
Cole, Martin; Non-Final Office Action for U.S. Appl. No. 14/490,095, filed Sep. 18, 2014, dated Jun. 15, 2016, 24 pgs.
Zigovszki, Szabolcs; Final Office Action for U.S. Appl. No. 14/490,403, filed Sep. 18, 2014, dated Oct. 3, 2016, 23 pgs.
Zigovszki, Szabolcs; Corrected Notice of Allowability for U.S. Appl. No. 14/490,412, filed Sep. 18, 2014, dated Sep. 20, 2016, 7 pgs.
Zigovszki, Szabolcs; Issue Notification for U.S. Appl. No. 14/490,412, filed Sep. 18, 2014, dated Oct. 5, 2016, 1 pg.
Cole, Martin; Final Office Action for U.S. Appl. No. 14/490,095, filed Sep. 18, 2014; dated Oct. 6, 2016; 16 pgs.
Cullinan, Thomas; Non-Final Office Action for U.S. Appl. No. 14/954,322, filed Nov. 30, 2015, dated Nov. 2, 2016; 37 pgs.
Zigovszki, Szabolcs; Final Office Action for U.S. Appl. No. 14/490,381, filed Sep. 18, 2014, dated Jan. 31, 2017, 26 pgs.
Zigovszki, Szabolcs; Applicant Initiated Interview Summary for U.S. Appl. No. 14/490,403, filed Mar. 18, 2014, dated Dec. 1, 2016, 7 pgs.
Zigovszki, Szaboles; Notice of Allowance for U.S. Appl. No. 14/490,403, filed Sep. 18, 2014, dated Feb. 6, 2017, 9 pgs.
Cole, Martin; Notice of Allowance for U.S. Appl. No. 14/490,095, filed Sep. 18, 2014, dated Jan. 13, 2017, 13 pgs.

Zigovszki, Szabolcs; PCT Application entitled: Real-Time Flow Compensation in Usage Accumulcation having serial No. PCT/US15/44156, filed Aug. 7, 2015, 26 pgs.
Zigovszki, Szabolcs; PCT Application entitled: Tamper Detection Through Magnetic Sensing having serial No. PCT/US15/50080, filed Sep. 15, 2015, 26 pgs.
Zigovszki, Szabolcs; PCT Application entitled: Reverse Flow Detection and Annunication having serial No. PCT/US15/44147, filed Aug. 7, 2015, 24 pgs.
Martin, Cole; PCT Application entitled: Adjustable Meter With Tamper Detection having serial No. PCT/US15/44154, field Aug. 7, 2015, 35 pgs.
Zigovszki, Szabolcs; U.S. Patent Application entitled: Mode Activation Using Light Detection, U.S. Appl. No. 14/490,381, filed Sep. 18, 2014, 31 pgs.
Zigovszki, Szabolcs; U.S. Patent Application entitled: Tamper Detection Through Magnetic Sensing, U.S. Appl. No. 14/490,403, filed Sep. 18, 2014; 24 pgs.
Zigovszki, Szabolcs; U.S. Patent Application entitled: Reverse Flow Detection and Annunciation, U.S. Appl. No. 14/490,412, filed Sep. 18, 2014; 26 pgs.
Cole, Martin; U.S. Patent Application Entitled: Adjustable Meter With Tamper Detection, U.S. Appl. No. 14/490,095, filed Sep. 18, 2014; 36 pgs.
Cullinan, Thomas; U.S. Patent Application entitled: Solid-State Register Initiated Poll of Status Information having U.S. Appl. No. 14/954,322, filed Nov. 30, 2015, 26 pgs.
Zigovszki, Szabolcs; International Search Report and Written Opinion for serial No. PCT/US15/44156, filed Aug. 7, 2015, dated Nov. 6, 2015, 9 pgs.
Zigovszki, Szabolcs; International Search Report and Written Opinion for serial No. PCT/US15/50080, filed Sep. 15, 2015, dated Dec. 10, 2015, 8 pgs.
Zigovszki, Szabolcs; International Search Report and Written Opinion for serial No. PCT/US15/44147, filed Mar. 7, 2015, dated Nov. 6, 2015, 8 pgs.
Martin, Cole; International Search Report and Written Opinion for Application No. PCT/US15/44154, filed Aug. 7, 2015, dated Dec. 31, 2015, 12 pgs.
Zigovszki, Szabolcs; Advisory Action for U.S. Appl. No. 14/490,381, filed Sep. 18, 2014, dated Jun. 15, 2017, 7 pgs.
Zigovszki, Szabolcs; Corrected Notice of Allowability for U.S. Appl. No. 14/490,403, filed Sep. 18, 2014, dated May 5, 2017, 10 pgs.
Zigovszki, Szabolcs; Issue Notiication for U.S. Appl. No. 14/490,403, filed Sep. 18, 2014, dated May 17, 2017, 2 pgs.
Cullinan, Thomas; Advisory Action for U.S. Appl. No. 14/954,322, filed Nov. 30, 2015, dated Jun. 20, 2017, 8 pgs.
Cullinan,Thomas; Applicant-Initiated Interview Summary for U.S. Appl. No. 14/954,322, filed Nov. 30, 2015, dated May 17, 2017, 3 pgs.
Zigovszki, Szaboles; Corrected Notice of Allowability for U.S. Appl. No. 14/490,403, filed Sep. 18, 2014, dated Apr. 21, 2017, 6 pgs.
Cullinan,Thomas; Final Office Action for U.S. Appl. No. 14/954,322, filed Nov. 30, 2015, dated Apr. 10, 2017, 29 pgs.
Zigovszki, Szabolcs; International Preliminary Report on Patentability for Application No. PCT/US15/44156, filed Aug. 7, 2015, dated Mar. 30, 2017, 8 pgs.
Zigovszki, Szabolcs; International Preliminary Report on Patentability for Application No. PCT/US15/50080, filed Sep. 15, 2015, dated Mar. 30, 2017, 7 pgs.
Zigovszki, Szabolcs; International Preliminary Report on Patentability for Application No. PCT/US15/44147, filed Aug. 7, 2015, dated Mar. 30, 2017, 7 pgs.

* cited by examiner

Factor Table 800

| # | PULSE COUNT | FACTOR |
|---|---|---|
| 1 | 23 | 0.002278 |
| 2 | 28 | 0.002267 |
| 3 | 57 | 0.002245 |
| 4 | 113 | 0.002208 |
| 5 | 226 | 0.002190 |
| 6 | 1130 | 0.002201 |
| 7 | 2260 | 0.002212 |
| ... | ... | ... |
| 32 | 6103 | 0.002234 |

402A, 402B, 402C, 402D, 402E, 402F, 402G, 402N

700

702 ACCUMULATE USAGE W/ FLOW COMPENSATION
704 READ PULSE COUNT
706 LOOKUP FACTOR BASED ON PULSE COUNT
UPDATE ACCUMULATOR WITH PULSE COUNT * FACTOR
END

REAL-TIME FLOW COMPENSATION IN USAGE ACCUMULATION

BACKGROUND

Conventional water, gas, or other utility meters normally include a mechanical register for accumulating and displaying usage data for customers and utility provider personnel (e.g., meter readers). A typical register may include odometer-style wheels and/or dials that collectively record the total volume of product used. These registers may be driven by a mechanical or magnetic coupling with a measuring element inside of a measuring chamber of the meter. Gears in the register convert the motion of the measuring element to the proper usage increment for display on the dials and/or wheels. The mechanical register may further include a means of converting the current position of the dials and wheels to an electronic signal for sending the current usage data electronically to automatic meter reading ("AMR") or advanced metering infrastructure ("AMI") systems for remote reading and/or monitoring of the metered consumption.

As an alternative to mechanical registers, a solid-state register ("SSR") may be utilized in meters by a utility provider. SSRs are totally electronic with no mechanical gearing or moving parts and may interface magnetically with the measuring element inside of the measuring chamber of the meter. The SSR uses electronics and firmware programming to detect flow, accumulate usage, and display usage on an LCD or other electronic display. Other operational metrics beyond usage may also be determined and/or displayed, such as average flow rate, instant flow rate, reverse flow, and the like. The programmatic nature of the SSR may allow a single model of register to be programmed with the appropriate parameters and scaling factors to work with a variety of meters and provide higher consumption resolution and accuracy than mechanical odometer registers. SSRs may also provide for the implementation of features not available in traditional mechanical registers, such as accumulation, display, and reporting of operational metrics beyond usage, alarming capability via AMR/AMI systems for tamper conditions and reverse flow, and the like.

It is with respect to these and other considerations that the disclosure made herein is presented.

BRIEF SUMMARY

The present disclosure relates to technologies for compensating for inaccuracies in flow measurement in real-time during accumulation of usage. According to some embodiments, a method of compensating for inaccuracies in flow measurement in a meter during accumulation of usage comprises reading a pulse count indicating an amount of flow in the meter over a measurement period. An average flow rate through the meter for the measurement period is determined and a correction factor is looked up from a table based on the average flow rate. A total usage accumulator for the meter is then updated with the amount of flow over the measurement period based on the pulse count and the correction factor.

According to further embodiments, a computer-readable storage medium comprises processor-executable instructions that, when executed by a processing unit in a meter, causes the processing unit to determine an amount of flow through a meter over a measurement period. An average flow rate through the meter for the measurement period is then determined, and a correction factor is looked up from a compensation table based on the average flow rate. The processing unit then calculates a new value for a total usage accumulator for the meter based on the amount of flow over the measurement period and the correction factor.

According to further embodiments, a system comprises a measuring chamber of a meter assembly, the measuring chamber containing a measuring device, and a solid-state register implemented in the meter assembly. The solid-state register is magnetically coupled to the measuring device and includes a microcontroller. The microcontroller is configured to count a number of pulses from the measurement device during a measurement period that indicates a volume of flow through the meter over the measurement period. The microcontroller then lookups a factor from a table based on the number of pulses counted during the measurement period, and updates a total usage accumulator in the solid-state register with an amount of flow over the measurement period, where the amount of flow over the measurement period is calculated from the number of pulses and the factor.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 3:
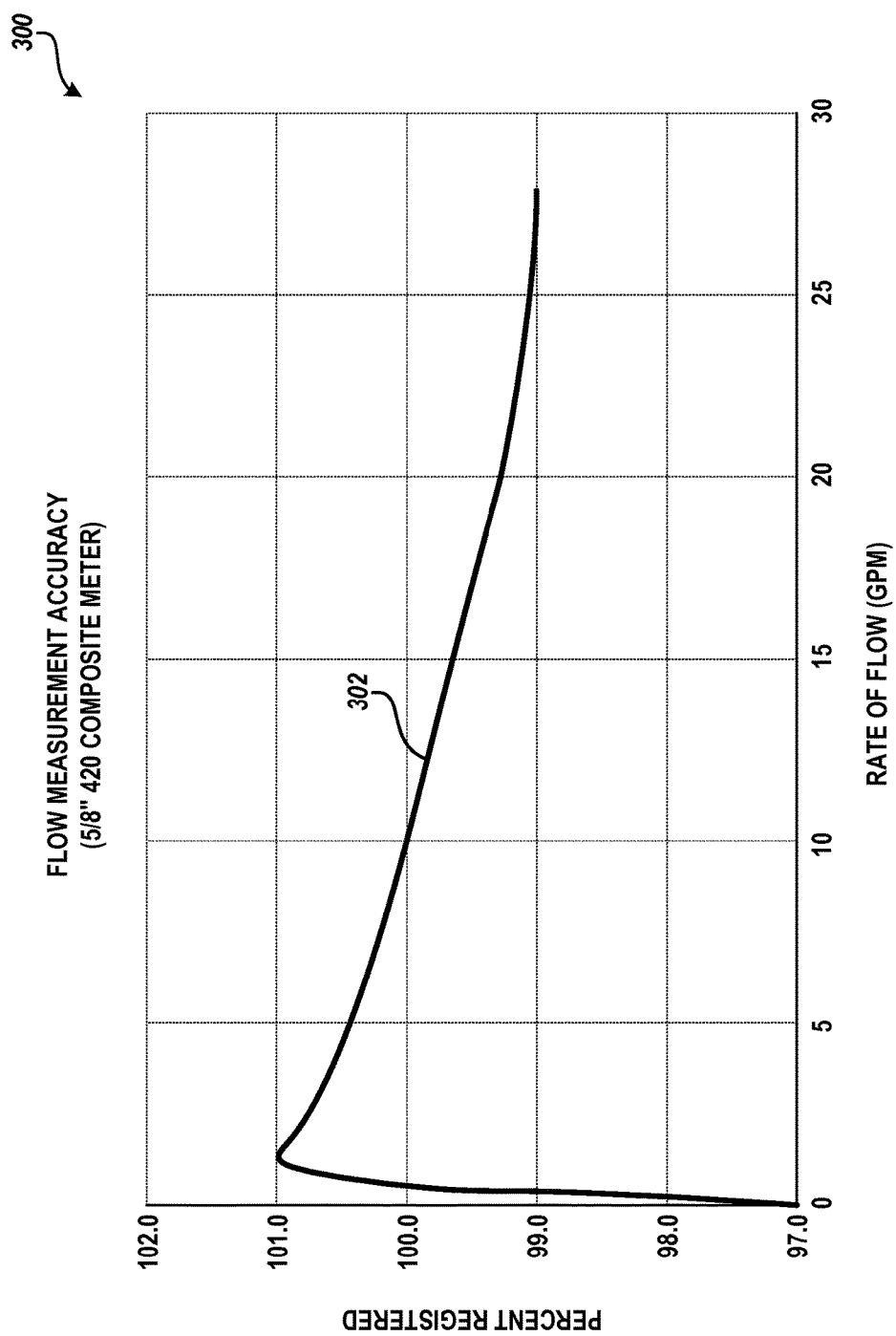
FIG. 3 is a graph of an accuracy curve for a typical water meter, according to embodiments described herein.

The following detailed description is directed to technologies for compensating for inaccuracies in flow measurement in real-time during accumulation of usage. Using the technologies described herein, a solid-state register ("SSR") may be configured to compensate for varying inaccuracies in measuring flow over different flow rates inside a water, gas, or other utility meter. The compensation can be performed in real-time during usage accumulation by the SSR. By implementing the flow compensation routine(s) described herein, the overall measurement accuracy of utility meters may be improved. A typical accuracy curve 302 for a water meter is shown in the graph 300 of FIG. 3. As may be seen in the graph, the measurement accuracy of the meter deviates from the ideal 100% at very low and very high flow rates.

The flow compensation routines in the SSR may utilize a compensation table derived from the accuracy curve 302 for the particular meter for which the SSR is utilized. The compensation table in the SSR may be configurable, or the SSR may contain a number of compensation tables corresponding to different meter types and models, thus making the SSR compatible with any number of meters. During the main accumulation routine of the SSR, the flow compensation routines may determine a current average flow rate and use the flow rate to retrieve a correction factor from the compensation table. The correction factor may then be utilized in the accumulation routine to improve the accuracy of usage accumulation in the meter.

Figure 1:
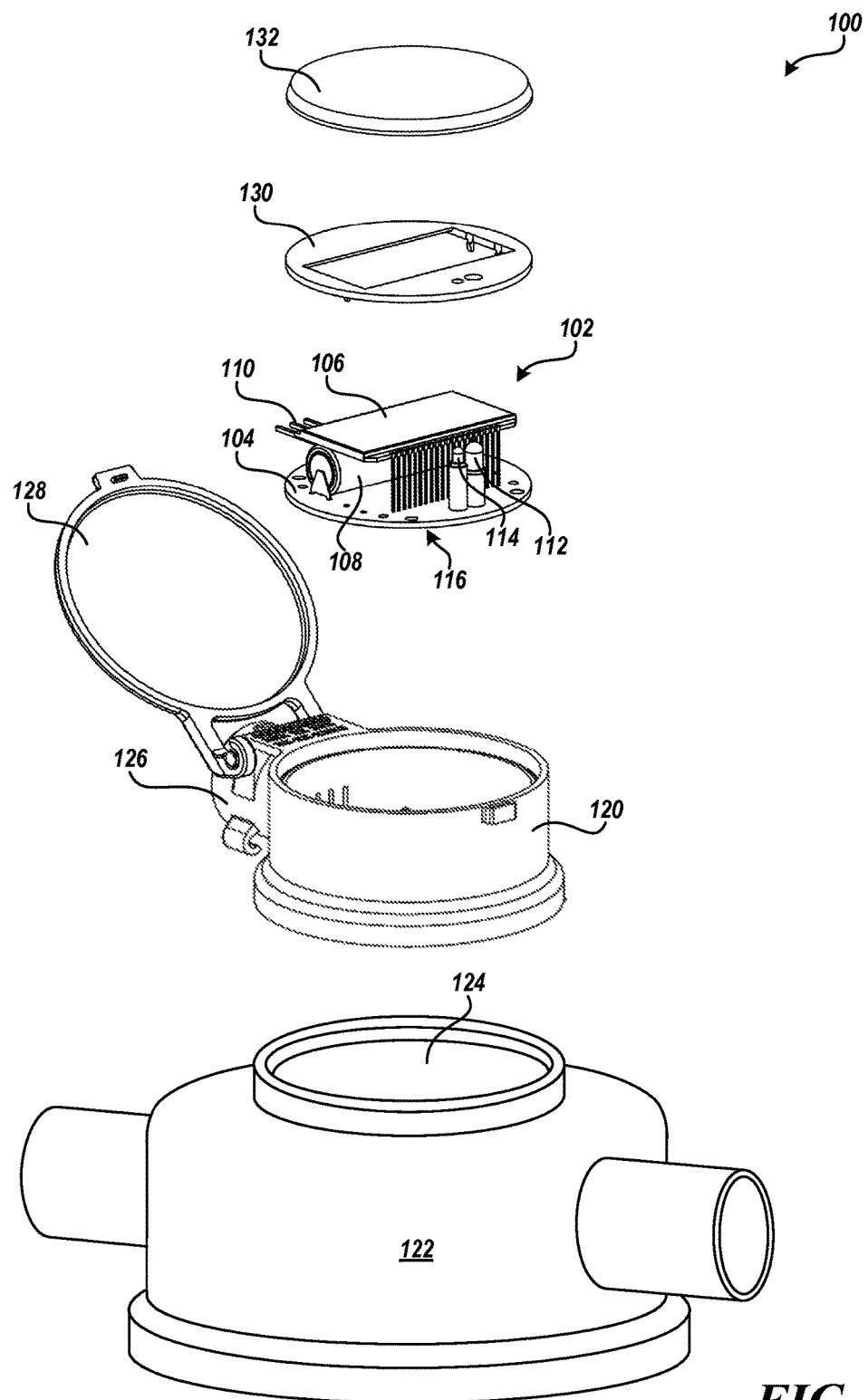
FIG. 1 is a perspective view showing an assembly of an illustrative water meter including a solid-state register, according to embodiments described herein.

FIG. 1 is a perspective view showing an assembly of an illustrative water meter 100 that implements an SSR 102, according to some embodiments. According to embodiments, the SSR 102 comprises a printed circuit board ("PCB") 104 upon which various components are attached. In some embodiments, the SSR 102 may include a liquid crystal display ("LCD") 106 or other electronic display connected to the PCB 104. The LCD 106 may display the accumulated usage to a local observer, such as a customer, installer, meter reader, or other utility provider personnel. The LCD 106 may also display other operational parameter information, such as flow rates, meter ID, model number of the meter 100 and/or SSR 102, test mode accumulation, error codes, and the like. The LCD 106 may further indicate status information for the meter, such as units of measurement displayed, error conditions, flow direction, current operation mode, battery condition, and the like.

The SSR 102 may further include a battery 108 for powering the operation of the electronic components of the SSR. In some embodiments, the power requirements of the SSR 102 may allow the battery 108 to power the SSR for an extended period of time in normal operation, such as 20 years. The SSR 102 may also include an interface connector 110 for electronically connecting the SSR to an external device, such as an AMR or AMI communication device, a portable programming device, or the like. In some embodiments, the interface connector 110 may comprise a three-wire connector. The SSR 102 may also include an optical sensor 112 or photo-detector. The optical sensor 112 may allow the SSR 102 to detect light conditions within the meter 100 in order to determine the correct mode for operation. The optical sensor 112 may also serve as an infrared ("IR") detector. The SSR 102 may further include an IR emitter 114, which together with the optical sensor 112, provides an IR port for the SSR to communicate with external devices via IR, such as portable programming devices and the like.

The SSR 102 may be shaped and sized to be inserted into an enclosure 120. The enclosure may be mechanically configured to be attached to the measuring chamber 122 of the meter 100, such that a bottom surface 116 of the PCB 104 is within a defined distance of a top surface 124 of the measuring chamber. The bottom surface 116 of the PCB 104 may hold flow sensors and other detection devices that interface with a magnetic measuring element within the measuring chamber 122, such as rotating magnetic disc. The SSR 102 and the enclosure 120 may be configured to be compatible with a variety of measuring chambers 122 for a variety of models and types of meters 100.

Once positioned in the enclosure 120, the SSR 102 may be covered by a faceplate 130 and lens 132. The faceplate may include openings for the LCD 106, the optical sensor 112, and the IR emitter 114. The lens 132 may be sealed to the enclosure 120 in order to protect the SSR 102 from liquids or other external contaminants. The enclosure 120 may further include a recess 126 through which the interface connector 110 may extend allowing the SSR 102 to be connected to the external devices. The enclosure 120 may also include a cover 128 or lid which may be closed over the SSR 102 in order to protect the lens 132 as well as isolate the optical sensor 112 from external light sources.

Figure 2:
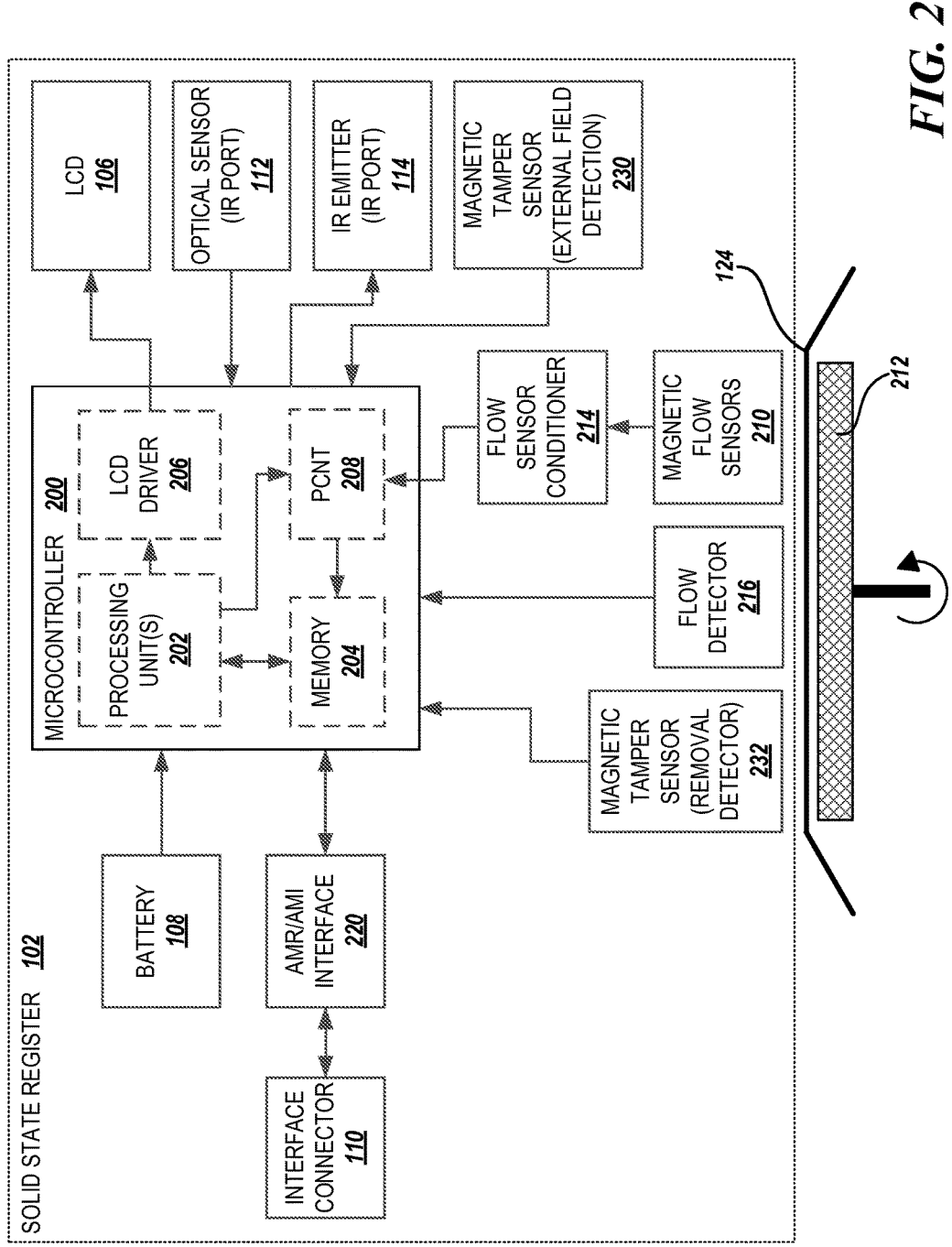
FIG. 2 is a block diagram of an illustrative solid-state register capable of executing the software components described herein for compensating for inaccuracies in flow measurement in real-time during accumulation of usage, according to embodiments described herein.

FIG. 2 shows a block diagram of the SSR 102, according to some embodiments. The SSR 102 includes a microcontroller 200 for performing the functions of the SSR as described herein. The microcontroller 200 may be a microcontroller unit ("MCU") designed for smart meter applications, such as the MC9S08GW64 from Freescale Semiconductor of Austin, Tex. The microcontroller 200 contains a variety of modules in a single, integrated circuit, including one or more processing units 202. The processing unit(s) 202 represent standard programmable processors that perform arithmetic and logical operations necessary for the operation of the SSR 102. The processing unit(s) 202 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The microcontroller 200 further includes a memory 204. The memory 204 may comprise a computer-readable storage medium for storing processor-executable instructions, data structures and other information. The memory 204 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 204 may store a firmware that comprises instructions, commands and data necessary for operation of the SSR 102. According to some embodiments, the memory 204 may store processor-executable instructions that, when executed by the processing units 202, perform the routines 600 and 700 for compensating for inaccuracies in flow measurement in real-time during accumulation of usage, as described herein.

In addition to the memory 204, the microcontroller 200 may have access to other computer-readable media storing program modules, data structures, and other data described herein for compensating for inaccuracies in flow measurement in real-time during accumulation of usage. It will be appreciated by those skilled in the art that computer-readable media can be any available media that may be accessed by the microcontroller 202 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The microcontroller 200 may further include an integrated LCD driver 206 for driving the LCD 106 or other electronic display to display accumulated usage information, operations parameters, error codes, status information, and the like. In some embodiments, the LCD 106 may comprise an LCD panel specifically designed for utility meter applications, such as the W527110 LCD panel from Truly Semiconductors Ltd. of Kwai Chung, Hong Kong. The microcontroller 200 may also include an integrated pulse counter unit 208, also referred to as a position counter ("PCNT"). The pulse counter unit 208 is a low power pulse sequence counter that receives one or more input signals from magnetic flow sensors 210 in the SSR 102. The magnetic flow sensors 210 may represent rotational sensors that sense the rotation of the measurement device, such as a rotating magnet 212, contained in the measurement chamber 122 of the meter 100. The magnetic flow sensors 210 send signals, or "pulses," based on the sensed rotation of the rotating magnet 212 to the pulse counter unit 208 that allow the pulse counter unit to accumulate a pulse count representing a volume of water, gas, electricity, or other product flowing through the meter 100.

In some embodiments, the magnetic flow sensors 210 may comprise a tunneling magnetoresistance ("TMR") angle sensor, such as the NVE AAT001-10E from NVE Corporation of Eden Prairie, Minn. The TMR sensor may provide rotational position measurements in a rotating magnetic field that provides the necessary pulse sequences to the pulse counter unit 208 for the pulse counter unit to determine both the flow direction and quantity of the flow. The magnetic flow sensors 210 may be mounted on the bottom surface 116 of the PCB 104 such that it is in proximity of the magnetic field created by the rotating magnet 212 through the top surface 124 when the enclosure 120 containing the SSR 102 is coupled to the measurement chamber 122. According to some embodiments, the signals from the magnetic flow sensors 210 may be pre-processed by a flow sensor conditioner 214 before being provided to the pulse counter unit 208. For example the signals from the magnetic flow sensors 210 may pass through a dual push-pull comparator, such as the Microchip MCP6542 from Microchip Technology Inc. of Chandler, Ariz.

In some embodiments, the pulse counter unit 208 may be configured to operate in a two-signal gray mode (also referred to as quadrature mode) to detect and accumulate pulse counts for both forward and reverse flows. Once configured by the firmware, the pulse counter unit 208 may run independently of the processing units as long as flow is detected in the meter 100. According to some embodiments, the pulse counter unit 208 may maintain two distinct registers in the microcontroller's memory 204 or processing unit(s) 202, one forward flow pulse counter and one reverse flow pulse counter.

According to some embodiments, the SSR 102 further includes a flow detector 216. The flow detector 216 may comprise a low-power reed switch or other sensor that detects a change in the magnetic field from the rotating magnet 212 and signals the microcontroller 200 to provide power to the magnetic flow sensors 210 and/or to activate the pulse counting unit 208. In this way, the SSR 102 may operate in an extremely low power mode when no flow is detected to preserve the life of the battery 106. As with the magnetic flow sensors 210, the flow detector 216 may be mounted on the bottom surface 116 of the PCB 104 such that it is in proximity of the magnetic field created by the rotating magnet 212 through the top surface 124 of the measurement chamber 122.

The microcontroller 200 may further connect with other components of the SSR 102 through a variety of interfaces of the microcontroller. For example, the microcontroller 200 interfaces with the optical sensor 112 described above in order to detect changes in external light conditions in order to switch the SSR 102 to the appropriate mode of operation. In some embodiments, the optical sensor 112 may comprise a phototransistor, such as the PT333-3C from Everlight Electronics Co., Ltd. of New Taipei City, Taiwan. In further embodiments, the microcontroller 200 may further utilize interfaces with the optical sensor 112 and the IR emitter 114 to provide an IR port for two-way communication with external devices, for configuration of the SSR 102, updating of the firmware, and the like.

The microcontroller 200 may further include an AMR/AMI interface 220 for communicating with an external device through the interface connector 110, such as an AMR or AMI communication device, a portable programming device, or the like. The AMR/AMI interface 220 may provide for receiving and responding to interrogatories and commands from the external device, such as a request for accumulated usage data or current status information regarding the SSR. The AMR/AMI interface 220 may further allow the microcontroller 200 to initiate communication with the external device, according to further embodiments. In some embodiments, the AMR/AMI interface 220 may utilize a universal asynchronous receiver/transmitter ("UART") module integrated in the microcontroller 200 to provide a 3-wire, two-way serial interface with the external device.

In some embodiments, the SSR 102 may include a number of magnetic tamper sensors, such as magnetic tamper sensors 230 and 232, that interface with the microcontroller 200. For example, an external field detection sensor 230 may interface with the microcontroller 200 and provide a signal when the SSR 102 is subject to an external magnetic field. The external field detection sensor 230 may comprise a digital output magnetic sensor, such as the TCS20DPR from Toshiba of Tokyo, Japan, that may provide an indication of the relative strength of the detected magnetic field. Additionally or alternatively, a removal detector sensor 232 may interface with the microcontroller 200 and provide a signal indicating if the detector is removed from the magnetic field of the rotating magnet 212, indicating that the SSR 102 may have been dislodged or removed from the measurement chamber 122 of the meter 100. In some embodiments, the removal detector sensor 232 may comprise a three-axis digital magnetometer, such as the MAG3110 from Freescale Semiconductor. As with the magnetic flow sensors 210 and the flow detector 216, the removal detector sensor 232 may be mounted on the bottom surface 116 of the PCB 104 such that it is in proximity of the magnetic field created by the rotating magnet 212 through the top surface 124 of the measurement chamber 122.

It will be appreciated that the structure and/or functionality of the SSR 102 may be different than that illustrated in FIG. 2 and described herein. For example, while the processing unit(s) 202, memory 204, LCD driver 206, and pulse counter unit 208 are shown as modules integrated into the microcontroller 200, these components may represent discrete circuitry or components, or may be distributed among multiple integrated circuit packages. Similarly, the microcontroller 200, the flow sensor conditioner 214, the AMR/AMI interface 220 and other components of the SSR 102 may be integrated within a common integrated circuit package or distributed among multiple integrated circuit packages. The illustrated connection pathways are provided for purposes of illustration and not of limitation, and some components and/or interconnections may be omitted for purposes of clarity. It will be further appreciated that the SSR 102 may not include all of the components shown in FIG. 2, may include other components that are not explicitly shown in FIG. 2 or may utilize an architecture completely different than that shown in FIG. 2.

Figures 4, 5:
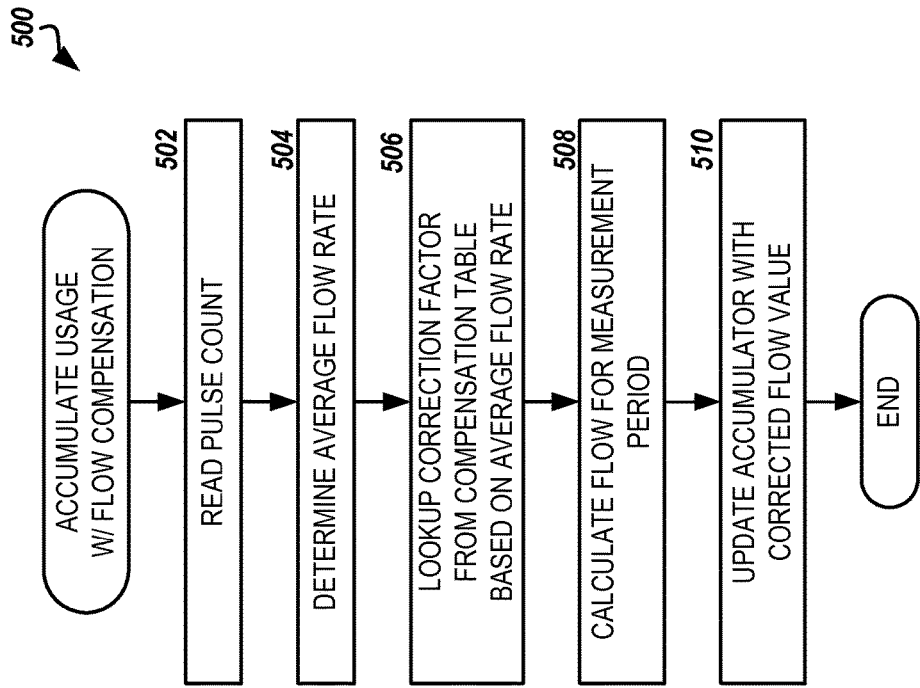
FIG. 4 is a data structure diagram showing one example of a compensation table for a typical water meter, according to embodiments described herein.
FIG. 5 is a flow diagram showing one routine for compensating for inaccuracies in flow measurement in real-time during accumulation of usage, according to embodiments described herein.
Figure 6:
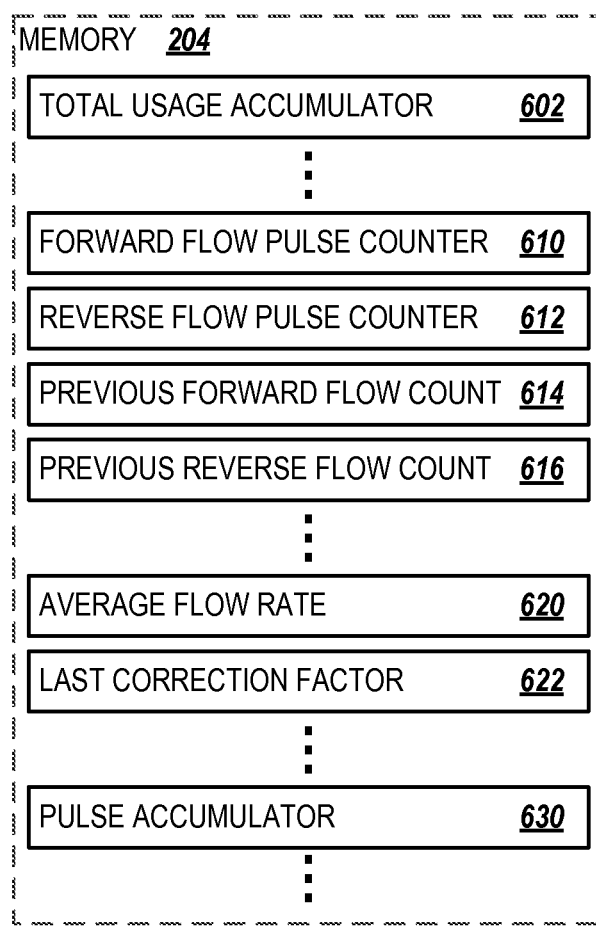
FIG. 6 is a data structure diagram showing data elements or registers stored in a memory of a microcontroller, according to embodiments described herein.
Figures 7, 8:
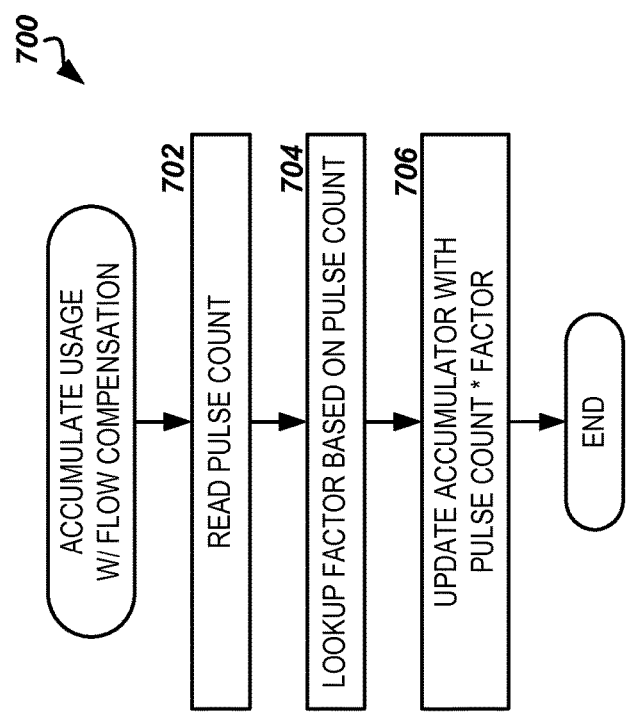
FIG. 7 is a flow diagram showing another routine for compensating for inaccuracies in flow measurement in real-time during accumulation of usage, according to embodiments described herein.
FIG. 8 is a data structure diagram showing one example of a factor table generated from the compensation table of FIG. 4, according to embodiments described herein.

FIGS. 4, 6, and 8 are data structure diagrams showing a number of data elements and data structures in computer storage. It will be appreciated by one skilled in the art that data structures shown in the figure may represent rows in a database table, instances of objects stored in a computer memory, programmatic structures, or any other data container commonly known in the art. Each data element may represent one or more fields or columns of a database table, one or more attributes of an object, one or more member variables of a programmatic structure, a register in a processing unit, or any other unit of data or data structure commonly known in the art. The implementation is a matter of choice, and may depend on the technology, performance, and other requirements of the computing system upon which the data structures and data elements are implemented.

FIG. 4 shows one example of a compensation table 400 maintained in the SSR 102 for a water meter 100. This compensation table 400 shown may be derived from the accuracy curve 302 for the water meter as shown in the graph 300 of FIG. 3, for example. In some embodiments, the compensation table 400 may be programmed into the non-volatile portion of the memory 204 of the microcontroller 200 during initial configuration of the SSR 102 based on the type and/or model of the meter 102 in which the SSR is being implemented. In further embodiments, the memory 204 of the SSR 102 may contain a number of compensation tables 400, each corresponding to different meter types or models. It will be appreciated that the compensation table(s) 400 may be further maintained in another component of the SSR 102 in addition to or as an alternative to the memory 204 of the microcontroller 200.

The compensation table 400 may comprise some number N of compensation value pairs 402A-402N (referred to herein generally as value pair 402), with each value pair comprising a flow rate value and a correction factor. According to some embodiments, the compensation table 400 may comprise a fixed number of value pairs 402, such as 32. The flow rate value of a value pair 402 indicates the upper range of flow rates for which the associated correction factor is applicable. In some embodiments, the value pairs 402 are arranged in ascending order of flow rate value to facilitate efficient, binary searching of the compensation table 400, as is disclosed below.

The correction factors may range from 0.75 to 1.25 (±25% compensation) and may be applied directly to the accumulated usage value for a given measurement period in order to compensate for variation in measurement accuracy in the meter 100 at the corresponding flow rate. The range of the flow rate values in the compensation value pairs 402 may depend on the units being measured by the SSR 102 (e.g., gallons per minute ("GPM"), liters per minute ("LPM"), cubic feet per minute ("FT$^3$/MIN"), etc.). It will be appreciated that additional data elements may be maintained in the compensation table 400 for each value pair 402 beyond those described herein. In addition, where the compensation table 400 comprises a fixed number of N value pairs 402 but contains fewer than N data points from the accuracy curve 302 for the corresponding meter 100, the remaining value pairs in the compensation table may contain high values for the flow rate in order to retain the searchable nature of the table.

FIG. 5 is a flow diagram showing one method for compensating for inaccuracies in flow measurement in real-time during accumulation of usage, according to some embodiments. Specifically, FIG. 5 illustrates one routine 500 for accumulating usage with flow compensation that may be implemented in the SSR 102. According to some embodiments, the routine 500 may be performed by the microcontroller 200 of the SSR 102 as shown in FIG. 2. The microcontroller 200 may be programmed to periodically update a total usage accumulator 602 from additional flow detected by the magnetic flow sensors 210 during the measurement period. The total usage accumulator 602 may be maintained in the memory 204 of the microcontroller 200, as shown in FIG. 6, or in another storage location in the SSR 102. As is described below, flow compensation may be applied in each update of the total usage accumulator 602, referred to herein as "in real-time."

The length of the measurement period may depend on the operation mode of the SSR 102. For example, the SSR 102 may operate in SLEEP mode for the majority of time. The SLEEP mode of operation may have preservation of battery power as its primary goal, and thus the micro-controller 200 may be woken up to update the total usage accumulator 602 at infrequent intervals, such as every 30 seconds. The SSR 102 may also have an ACTIVE mode of operation where the LCD 106 is active and the value of the total usage accumulator 602 is displayed on the LCD and updated frequently, allowing a local observer to view the accumulation of usage in real time. In the ACTIVE mode, the total usage accumulator 602 may be updated every 125 ms, for example. It will be appreciated that the SSR 102 may have other modes of operation beyond those described herein where the measurement periods are values other than 125 ms and 30 seconds.

The routine 500 begins at step 502, where the microcontroller 200 reads the pulse counter(s) maintained by the pulse count unit 208. As described above, the pulse count unit 208 may maintain two distinct registers in the memory 204 of the microcontroller 200 or other location in the SSR 102, a forward flow pulse counter 610 and a reverse flow pulse counter 612, as further shown in FIG. 6. The forward flow pulse counter 610 and the reverse flow pulse counter 612 may be incremented by the pulse count unit 208 upon detection of the corresponding signals from the magnetic flow sensors 210 indicating forward or reverse flow. Each pulse represents a specific volume of flow through the meter 100, represented by the K-factor. The K-factor equals the number of units of flow per pulse, or:

$$K\text{-factor}=1/\text{\# of pulses per unit flow}$$

where the K-factor and the unit flow are represented in the same units (gallons, liters, ft$^3$, etc.). According to embodiments, a nominal K-factor is configured in the SSR 102 based on the type or model of the meter 100 in which the SSR 102 is implemented. For the meter 100 represented in the compensation table 400 of FIG. 4, the nominal K-factor is 0.002212 gallons, for example.

To determine the number of pulses since the last measurement, the microcontroller 200 may further maintain two additional registers in the memory 204 or other storage location, a previous forward flow count 614 and a previous reverse flow count 616. Each time the microcontroller 200 updates the total usage accumulator 602, these registers may be updated with the current values of the forward flow pulse counter 610 and the reverse flow pulse counter 612, respectively, at the end of the routine. To determine the number of pulses since the last update, the microcontroller 200 may subtract the number of reverse flow pulses within the measurement period from the forward flow pulses in the measurement period. In other words, the pulse count for the measurement period equals:

pulse count=(forward flow pulse counter−previous forward flow count)−(reverse flow pulse counter−previous reverse flow count)

According to some embodiments, the values in the four registers may be stored as 16-bit unsigned integers. The microcontroller 200 may convert the resulting pulse count for the measurement period to binary-coded decimal ("BCD") for the remainder of the calculations described below.

Next, the routine 500 proceeds from step 502 to step 504, where the microcontroller 200 determines an average flow rate through the meter 100 over the measurement period. The units of the calculated average flow rate match those in the compensation table 400. For example, if the measurement period is 30 seconds, then the average flow rate in gallons per minute over the measurement period may be calculated by the following formula:

average flow rate (GPM)=pulse count*K-factor (gallons)*2

If the measurement period is short, then there may not be a sufficient number of pulses accumulated within the measurement period to prevent "jitter" in the flow rate calculation and corresponding compensation. In this instance, the average flow rate may be determined intermittently using pulse counts accumulated over a fixed window of time. For example, if the SSR 102 is operating in ACTIVE mode, then the routine 500 may be executed every 125 ms. According to some embodiments, the microcontroller 200 may calculate the average flow rate every 2 seconds. The microcontroller 200 may accumulate pulse counts over a 2 second window in a pulse accumulator 630 maintained in the memory 204 or other storage location. At every 16$^{th}$ iteration of the routine 500, the microcontroller 200 may calculate the average flow rate over the last 2 second window using the formula:

average flow rate (GPM)=pulse accumulator*K-factor (gallons)*30

The pulse accumulator 630 may be cleared after each 2 second window.

In another embodiment, the average flow rate may be calculated on each iteration of the routine 500, but calculated across a sliding window of time. For example, instead of the pulse accumulator 630 described above, the microcontroller 200 may maintain the last 8 pulse counts in memory 204, representing the last 1 second of flow measurements. The microcontroller 200 may calculate the average flow rate over a sliding window of the last 1 second of measurements using the formula:

average flow rate (GPM)=sum of last 8 pulse counts*K-factor (gallons)*60

After calculating the average flow rate, the microcontroller 200 may store the average flow rate 620 in the memory 204 or other location for use in iterations of the routine 500 where the average flow rate is not calculated and/or for display on the LCD 106 if selected by a user in certain modes of operation of the SSR 102.

From step 504, the routine 500 proceeds to step 506, where the microcontroller 200 uses the calculated average flow rate to lookup the associated correction factor from the compensation table 400. The microcontroller 200 may locate the first value pair 402 in the compensation table 400 having a flow rate greater than the calculated average flow rate and retrieve the associated correction factor. In some embodiments, the microcontroller 200 may utilize a binary search algorithm to locate the value pair 402 and retrieve the correction factor. According to further embodiments, the microcontroller 200 may store the last correction factor 622 in the memory 204 or other location for use in iterations of the routine 500 where the correction factor does not change. For example, when the SSR 102 is in ACTIVE mode, the microcontroller 200 may utilize the last correction factor 622 value stored in the memory 204 in order to prevent a lookup in the compensation table 400 every 125 ms.

The routine 500 proceeds from step 506 to step 508, where the microcontroller 200 calculates the flow in the appropriate units for the measurement period from the pulse count using the formula:

flow (gallons)=pulse count*K-factor (gallons)

Next, the routine 500 proceeds to step 510, where the total usage accumulator 602 is updated with the flow for the measurement period while compensating for inaccuracies in measurement at the current flow rate. The microcontroller may correct the flow for the measurement period using the retrieved correction factor and add the corrected flow to the total usage accumulator 602. In other words:

total usage accumulator (gallons)=total usage accumulator+(flow (gallons)*correction factor)

From step 510, the routine 500 ends.

FIG. 7 is a flow diagram showing another method for compensating for inaccuracies in flow measurement in real-time during accumulation of usage, according to some embodiments. Specifically, FIG. 7 illustrates an alternative routine 700 to the routine 500 described above that is optimized for more efficient processing. The routine 700 uses a factor table 800, as shown in FIG. 8, that is generated from the compensation table 400 for the specific measurement period. The factor table 800 may be generated during initialization of the SSR 102 and stored in the memory 204 for use by the microcontroller 200 while the SSR is operating in SLEEP mode, for example.

According to some embodiments, the factor table 800 contains a same number of value pairs 402A-402N as the compensation table 400, with each value pair comprising a pulse count and a factor value. The pulse count represents the upper bound of a flow rate (in pulses per the measurement period). The factor value represents the nominal K-factor value for the meter 100 corrected for the associated flow rate. According to some embodiments, for a measurement period of 30 seconds, each value pair 402 in the factor table 800 may be generated from the corresponding value pair in the compensation table 400 using the following formulas:

pulse count=flow rate/(K-factor*2)factor=correction factor*K-factor

The routine 700 begins at step 702, where the microcontroller 200 reads the pulse counter(s) maintained by the pulse count unit 208 to determine the number of pulses since the last update. As described above, the microcontroller 200 may subtract the number of reverse flow pulses for the measurement period from the forward flow pulses for the measurement period to determine the pulse count. From step 702, the routine 700 proceeds to step 704 where the microcontroller 200 uses the pulse count for the measurement period to lookup the associated factor value from the factor table 800. The microcontroller 200 may locate the first value pair 402 in the factor table having a pulse count greater than the pulse count for the measurement period. In some embodiments, the microcontroller 200 may utilize a binary search algorithm to locate the value pair 402 and retrieve the factor value. Utilizing the binary search algorithm, the microcontroller 200 may locate the value pair 402 in a factor table 800 comprising 32 value pairs 402 in five comparisons.

The routine 700 then proceeds from step 704 to step 706, where the microcontroller 200 updates the total usage accumulator 602 with the flow for the measurement period (represented by the pulse count) while compensating for inaccuracies in measurement at the current flow rate. This may be accomplished using the formula:

total usage accumulator=total usage accumulator+
(pulse count*factor value)

From step 706, the routine 700 ends. According to some embodiments, the MC9S08GW64 MCU described above may be able to perform the routine 700 in approximately 4 to 10 ms, saving battery power in the SSR 102. The efficient nature of the routine 700 may make it advantageous for use in the SSR 102 when operating in SLEEP mode. However, in some embodiments, the routine 700 may not be used while the SSR 102 is in modes other than the SLEEP mode. For example, the routine may not be suitable for use in the ACTIVE mode of operation of the SSR 102 because an average flow rate 602 is not calculated and stored in the memory 204 by the routine.

Based on the foregoing, it will be appreciated that technologies for compensating for inaccuracies in flow measurement in real-time during accumulation of usage are presented herein. While embodiments are described herein in regard to an SSR 102 implemented in a water meter 100, it will be appreciated that technologies described herein may be utilized in any programmable or configurable solid-state or electronic meter that measures the flow of any product, where variations in the accuracy of the measurement occur at various flow rates. The above-described embodiments are merely possible examples of implementations, set forth for a clear understanding of the principles of the present disclosure.

The logical operations, functions or steps described herein as part of a method, process or routine may be implemented (1) as a sequence of processor-implemented acts, software modules or portions of code running on a microcontroller, processing unit, or other computing system and/or (2) as interconnected machine logic circuits or circuit modules within the microcontroller, processing unit or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for compensating for inaccuracies in flow measurement in a meter during accumulation of usage, the method comprising steps of:
    reading, by a microcontroller in the meter, a pulse count from a pulse counter unit indicating an amount of flow in the meter over a measurement period;
    determining, by the microcontroller, an average flow rate through the meter for the measurement period;
    looking up, by the microcontroller, a correction factor associated with the average flow rate from a table stored in a memory of the microcontroller; and
    updating, by the microcontroller, a total usage accumulator in the memory with the amount of flow over the measurement period calculated from the pulse count and the correction factor, improving the measurement accuracy of the meter based on the updated total usage accumulator.

2. The method of claim 1, wherein the average flow rate is determined over a fixed window of time that is different from the measurement period.

3. The method of claim 1, wherein the table comprises a number of value pairs, each value pair comprising a representation of a flow rate and an associated correction factor.

4. The method of claim 3, wherein the correction factor represents an inaccuracy of measurement of the meter at the associated flow rate.

5. The method of claim 4, wherein the correction factor comprises a value from 0.75 to 1.25.

6. The method of claim 1, wherein the pulse count comprises a number of forward flow pulses that occurred during the measurement period minus a number of reverse flow pulses that occurred during the measurement period.

7. The method of claim 6, wherein the number of forward flow pulses that occurred during the measurement period and the number of reverse flow pulses that occurred during the measurement period is maintained by the pulse counting unit of the microcontroller.

8. The method of claim 1, wherein the microcontroller is implemented in a solid-state register of a water meter assembly.

9. A computer-readable storage medium having processor-executable instructions stored thereon that, when executed by a processing unit, cause the processing unit to:
determine an amount of flow through a meter over a measurement period;
determine an average flow rate through the meter for the measurement period;
lookup a correction factor associated with the average flow rate from a compensation from a compensation table stored in a memory operably connected to the processing unit; and
update a total usage accumulator in the memory with the amount of flow over the measurement period multiplied by the correction factor, improving the measurement accuracy of the meter based on the updated total usage accumulator.

10. The computer-readable storage medium of claim 9, wherein the average flow rate is determined over a fixed window of time that is different from the measurement period.

11. The computer-readable storage medium of claim 9, wherein the compensation table comprises a number of value pairs, each value pair comprising a representation of a flow rate and an associated correction factor.

12. The computer-readable storage medium of claim 11, wherein the correction factor represents an inaccuracy of measurement of the meter at the associated flow rate.

13. The computer-readable storage medium of claim 9, wherein determining the amount of flow over the measurement period comprises subtracting a number of reverse flow pulses that occurred during the measurement period from and a number of forward flow pulses that occurred during the measurement period to determine a pulse count for the measurement period.

14. The computer-readable storage medium of claim 13, wherein determining the amount of flow over the measurement period further comprises multiplying the pulse count for the measurement period by a K-factor value associated with the meter.

15. The computer-readable storage medium of claim 9, wherein the processing unit is implemented in a solid-state register of a water meter assembly.

16. A system comprising:
a measuring chamber of a meter assembly, the measuring chamber containing a measuring device; and
a solid-state register implemented in the meter assembly, the solid-state register magnetically coupled to the measuring device and comprising a microcontroller, the microcontroller configured to
count a number of pulses from the measurement device during a measurement period, the number of pulses indicating a volume of flow through the meter over the measurement period,
lookup a factor from a table based on the number of pulses counted during the measurement period, and
update a total usage accumulator in the solid-state register with an amount of flow over the measurement period, the amount of flow over the measurement period calculated from the number of pulses and the factor, improving the measurement accuracy of the meter assembly based on the updated total usage accumulator.

17. The system of claim 16, wherein the table comprises a number of value pairs, each value pair comprising a pulse count representing a flow rate and an associated factor.

18. The system of claim 16, wherein the microcontroller if further configured to generate the table for the measurement period, the table generated from a compensation table comprising normalized flow rates and associated correction factors, the correction factors representing an inaccuracy of measurement of the meter assembly at the associated flow rate.

19. The system of claim 16, wherein counting the number of pulses during a measurement period comprises counting a number of forward flow pulses and a number of reverse flow pulses that occurred during the measurement period.

20. The system of claim 16, wherein updating the total usage accumulator further comprises multiplying the number of pulses for the measurement period by a K-factor value configured in the solid-state register.

* * * * *